(12) United States Patent
Larkins

(10) Patent No.: US 12,024,131 B2
(45) Date of Patent: Jul. 2, 2024

(54) SWING AWAY TAILGATE BARBEQUE COOKING SYSTEM

(71) Applicant: William Douglas Larkins, Burns, TN (US)

(72) Inventor: William Douglas Larkins, Burns, TN (US)

(*) Notice: Subject to any disclaimer, the term of this patent is extended or adjusted under 35 U.S.C. 154(b) by 0 days.

(21) Appl. No.: 18/237,955

(22) Filed: Aug. 25, 2023

(65) Prior Publication Data

US 2023/0406217 A1 Dec. 21, 2023

Related U.S. Application Data

(63) Continuation of application No. 17/650,850, filed on Feb. 12, 2022.

(60) Provisional application No. 63/207,249, filed on Feb. 19, 2021.

(51) Int. Cl.
*B60R 9/06* (2006.01)
*A47J 37/07* (2006.01)

(52) U.S. Cl.
CPC ............ *B60R 9/06* (2013.01); *A47J 37/0704* (2013.01)

(58) Field of Classification Search
CPC ...... B60R 9/06; B60R 2011/004; B60R 11/00
See application file for complete search history.

*Primary Examiner* — Lynn E Schwenning
(74) *Attorney, Agent, or Firm* — Shane Cortesi

(57) ABSTRACT

The swing away tailgate barbeque cooking system allows for a cooking apparatus to be mounted on a vehicle or RV. Once at the location, the unit can swing away from the vehicle on a plane up to approximately 180 degrees. The user can then pivot the cooking apparatus into a position that is favorable for cooking. An adjustable leg or legs can be utilized which enable the unit to be much heavier than other swing away units. The adjustable legs make the unit very easy for one person to swing open or swing close. The adjustable legs also allow the unit to be in a level orientation when on uneven ground. The unit can be easily disconnected and rolled away from the carry vehicle. The unit can then be used as a stand-alone grill for home cooking.

34 Claims, 12 Drawing Sheets

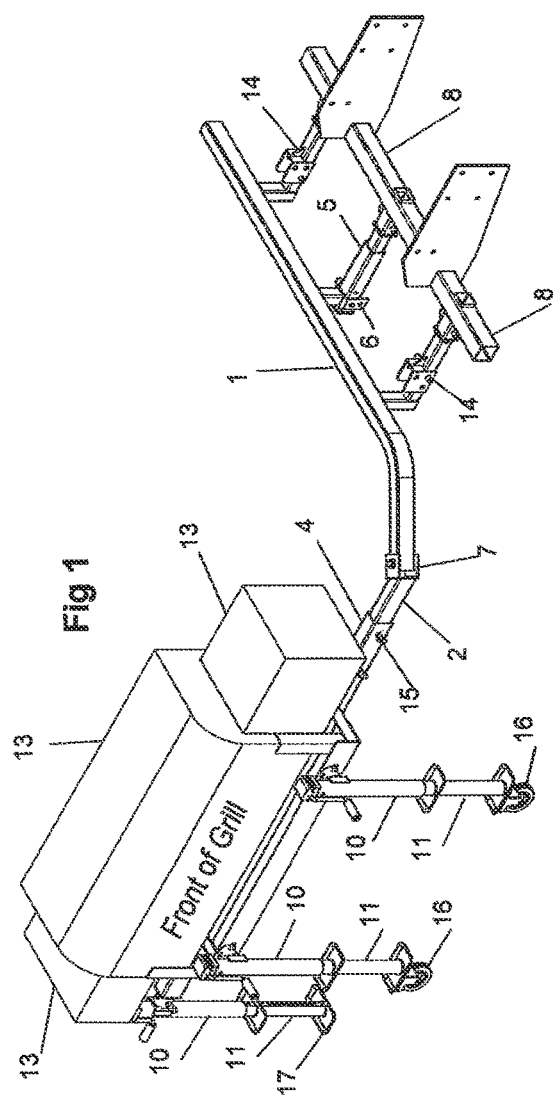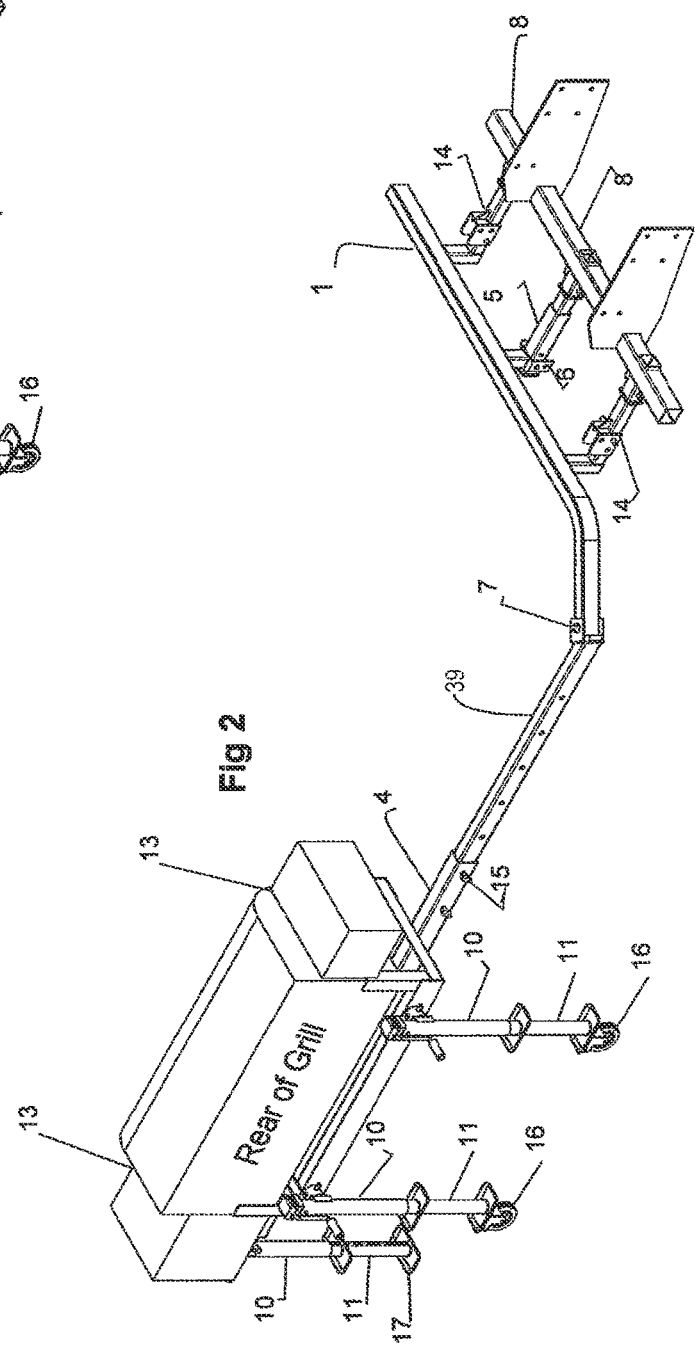

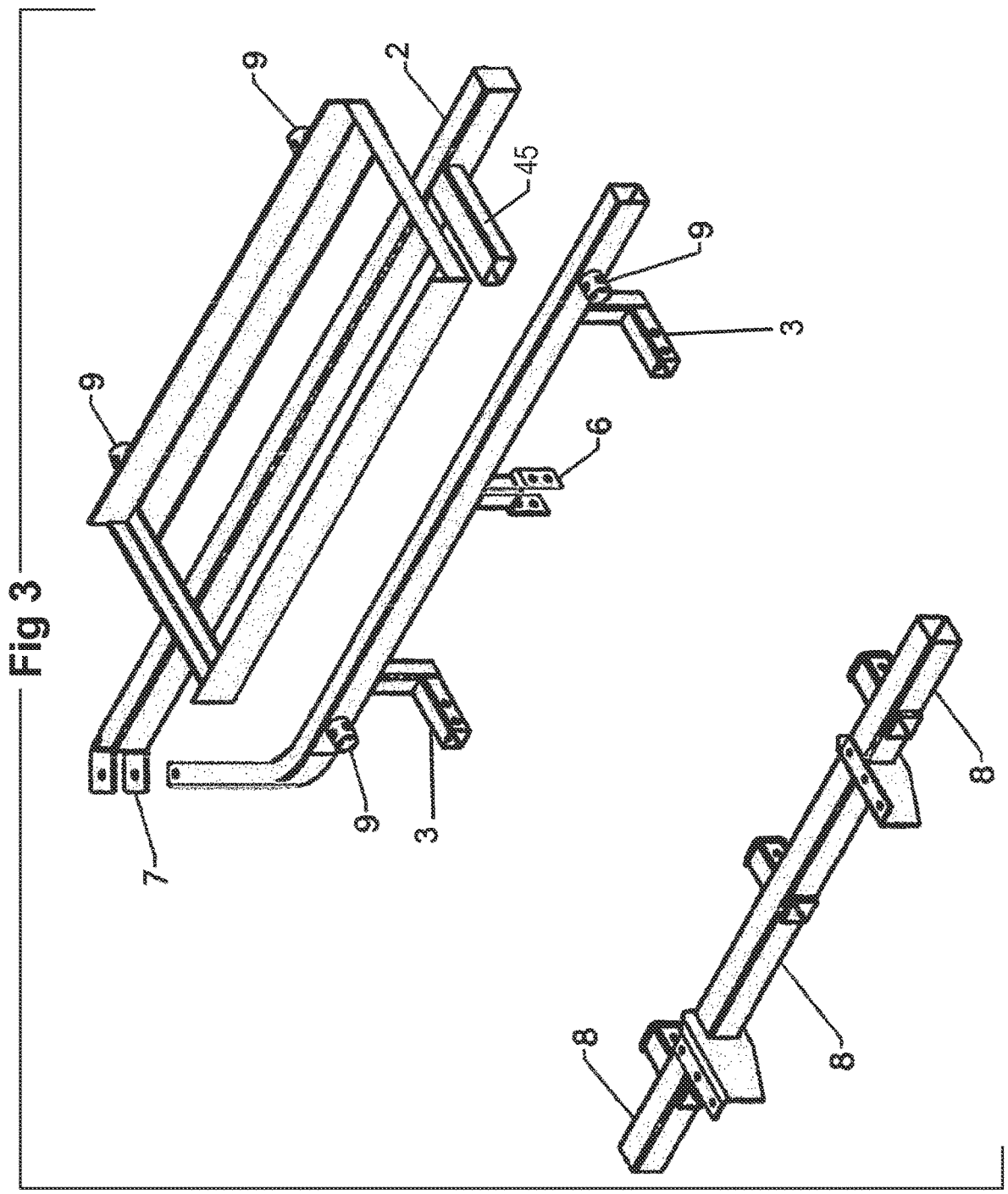

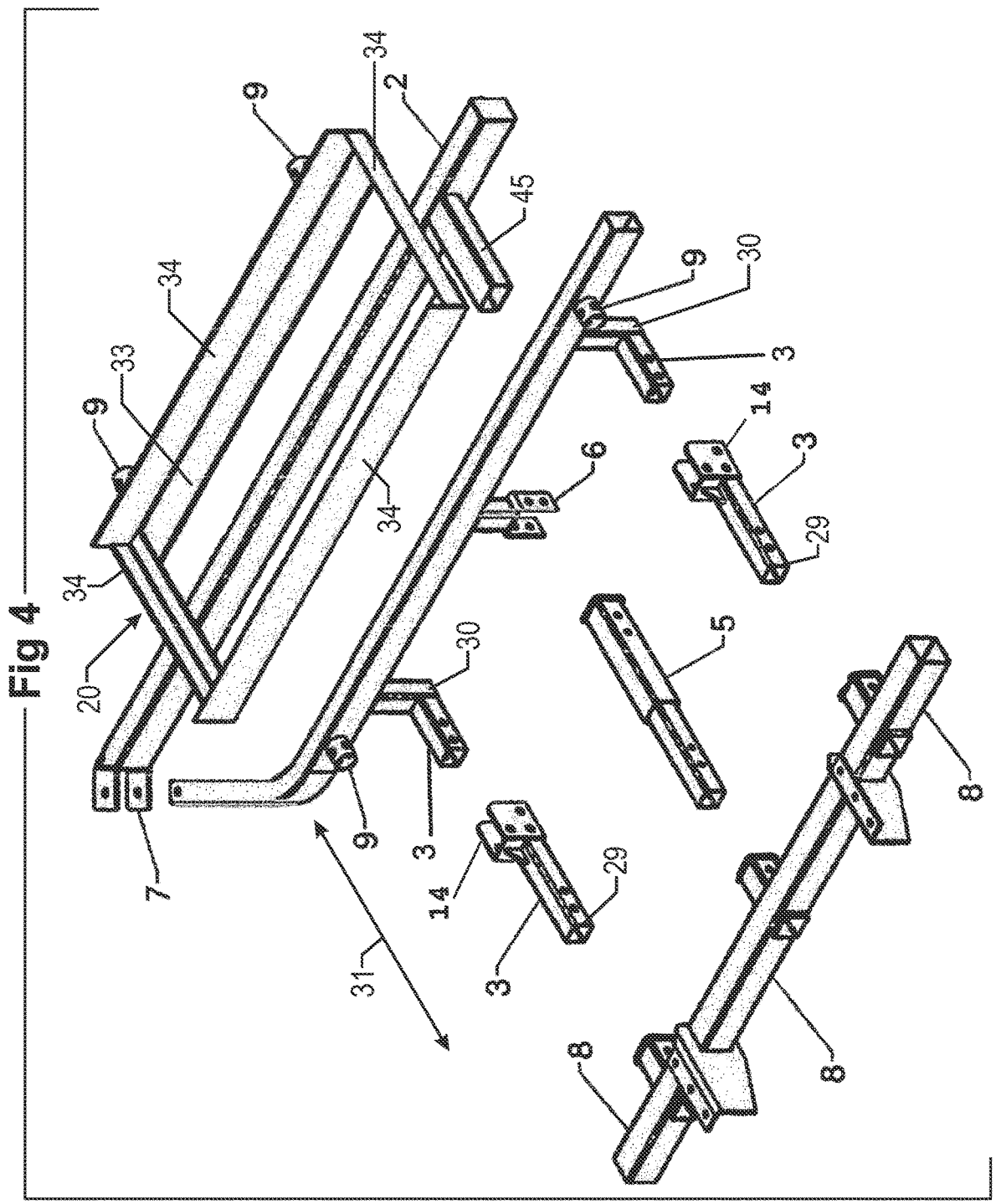

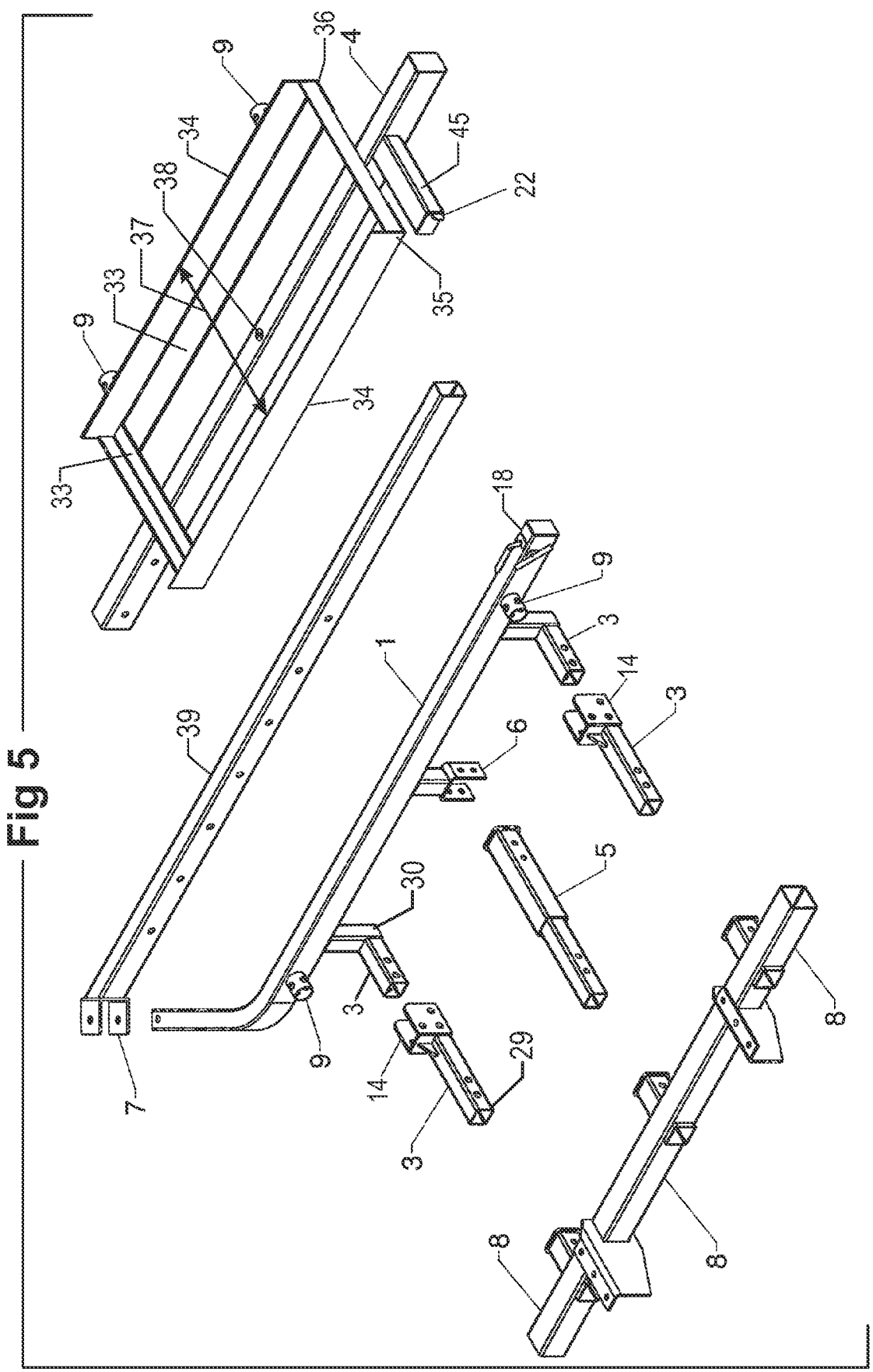

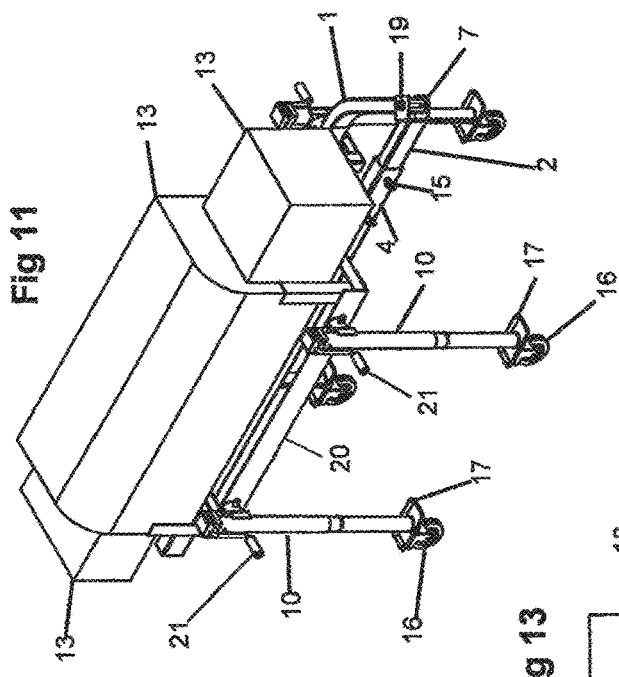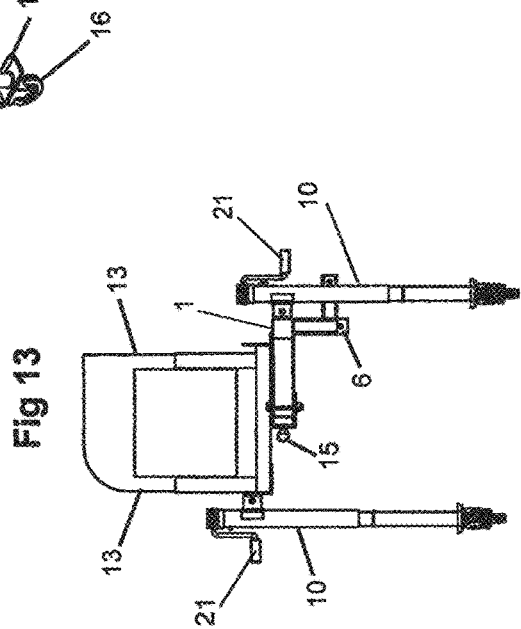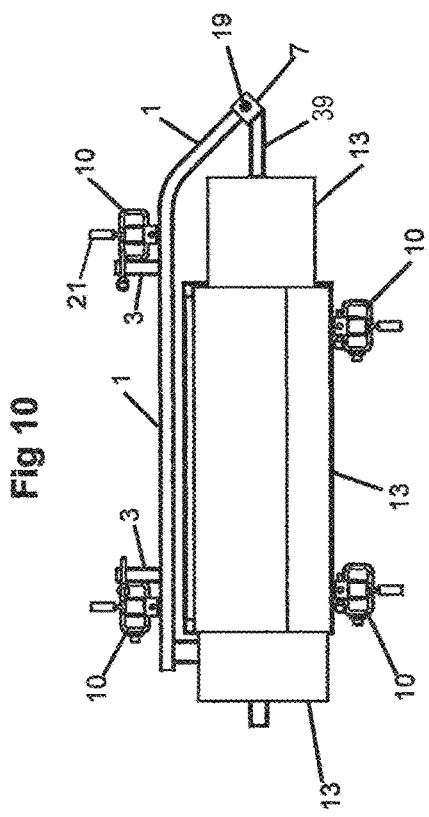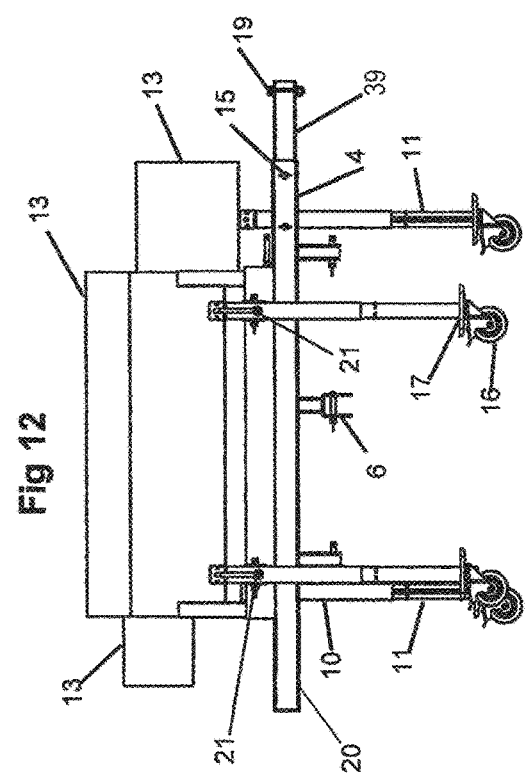

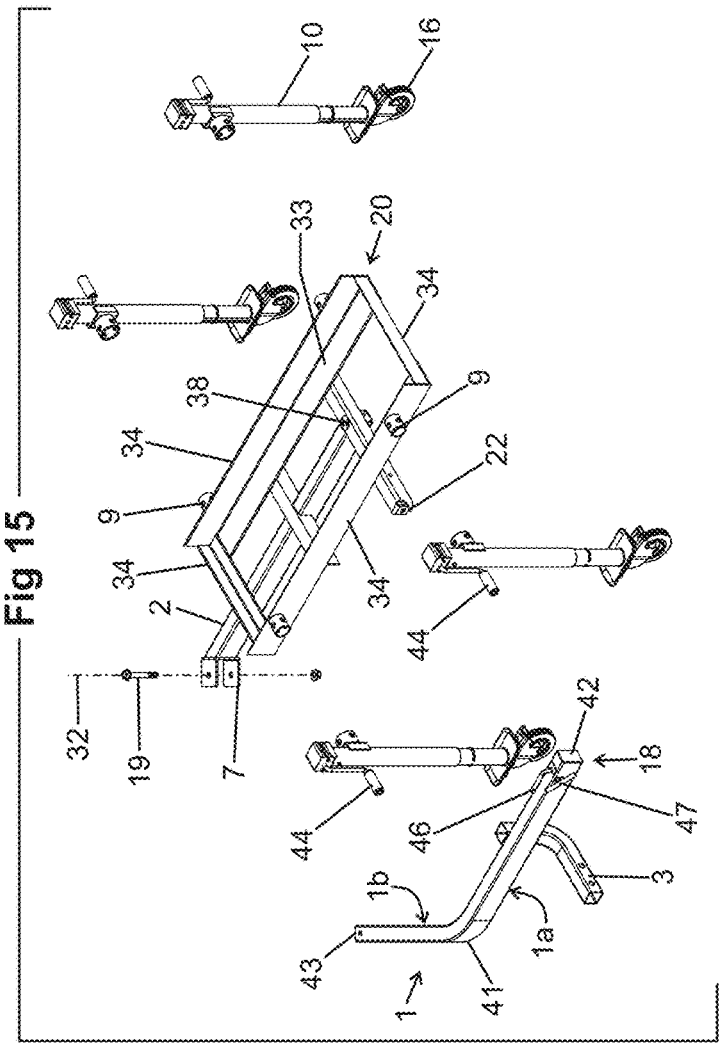
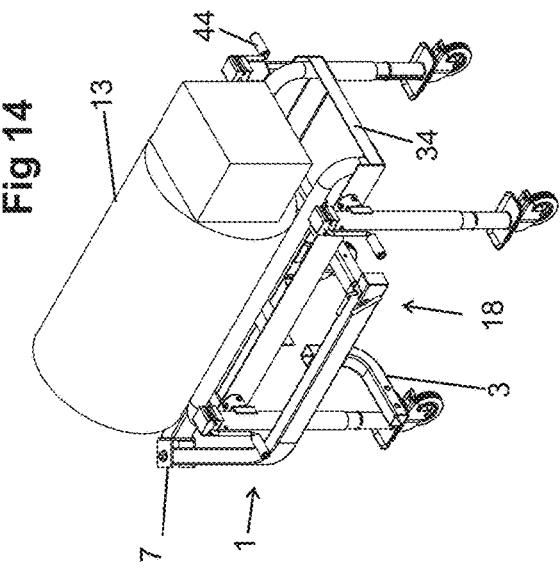
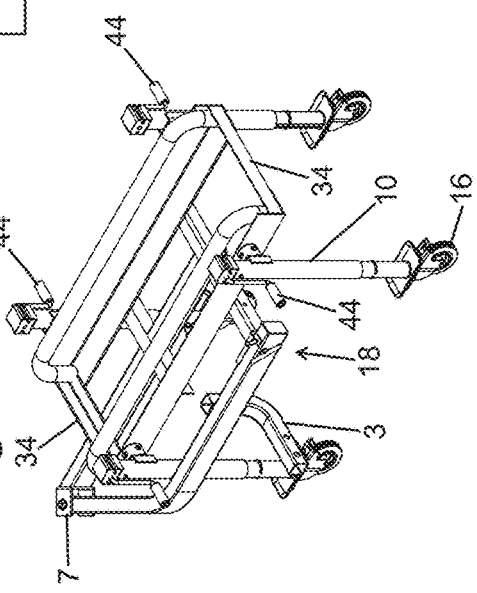

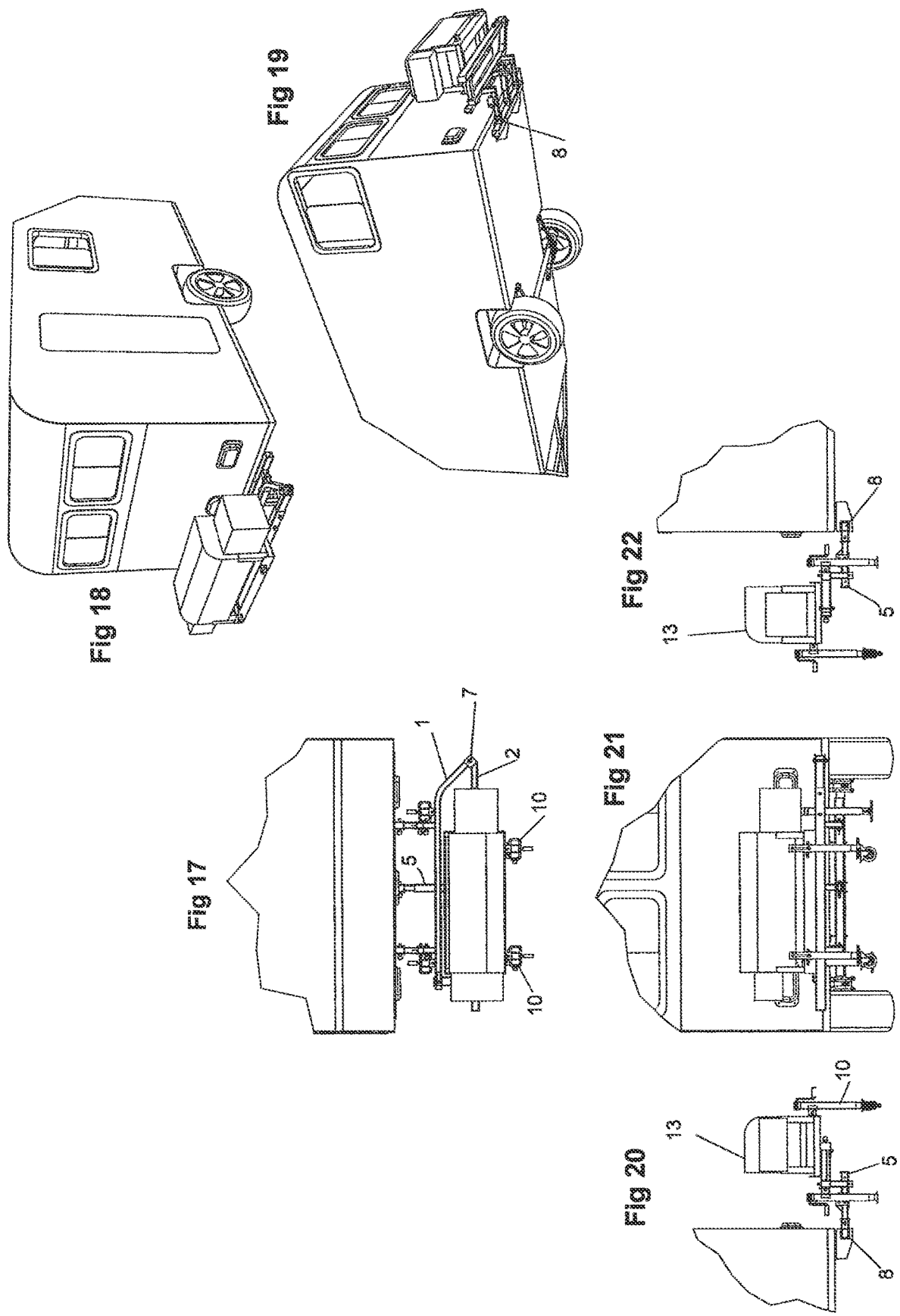

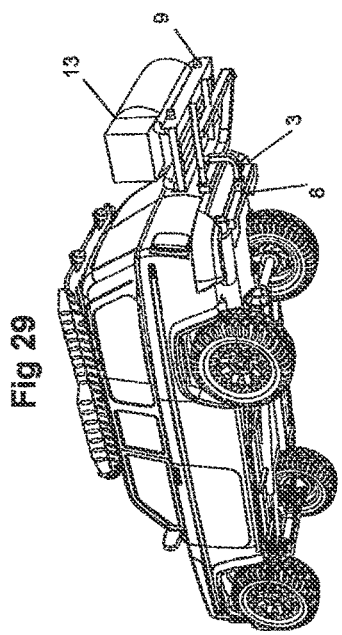
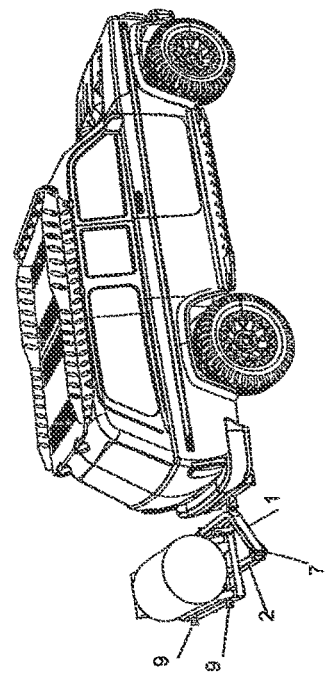
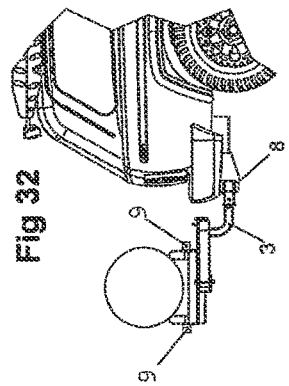
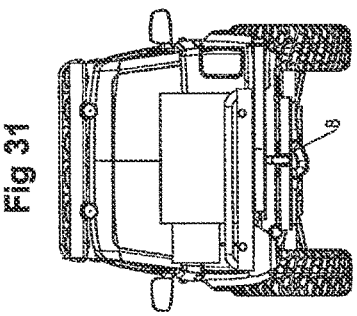
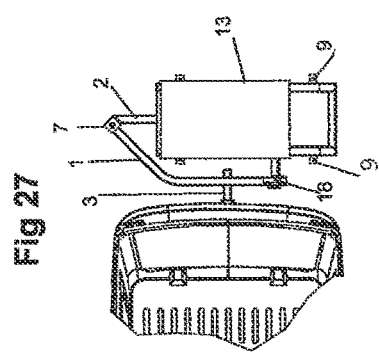
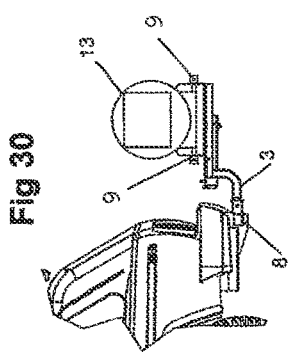

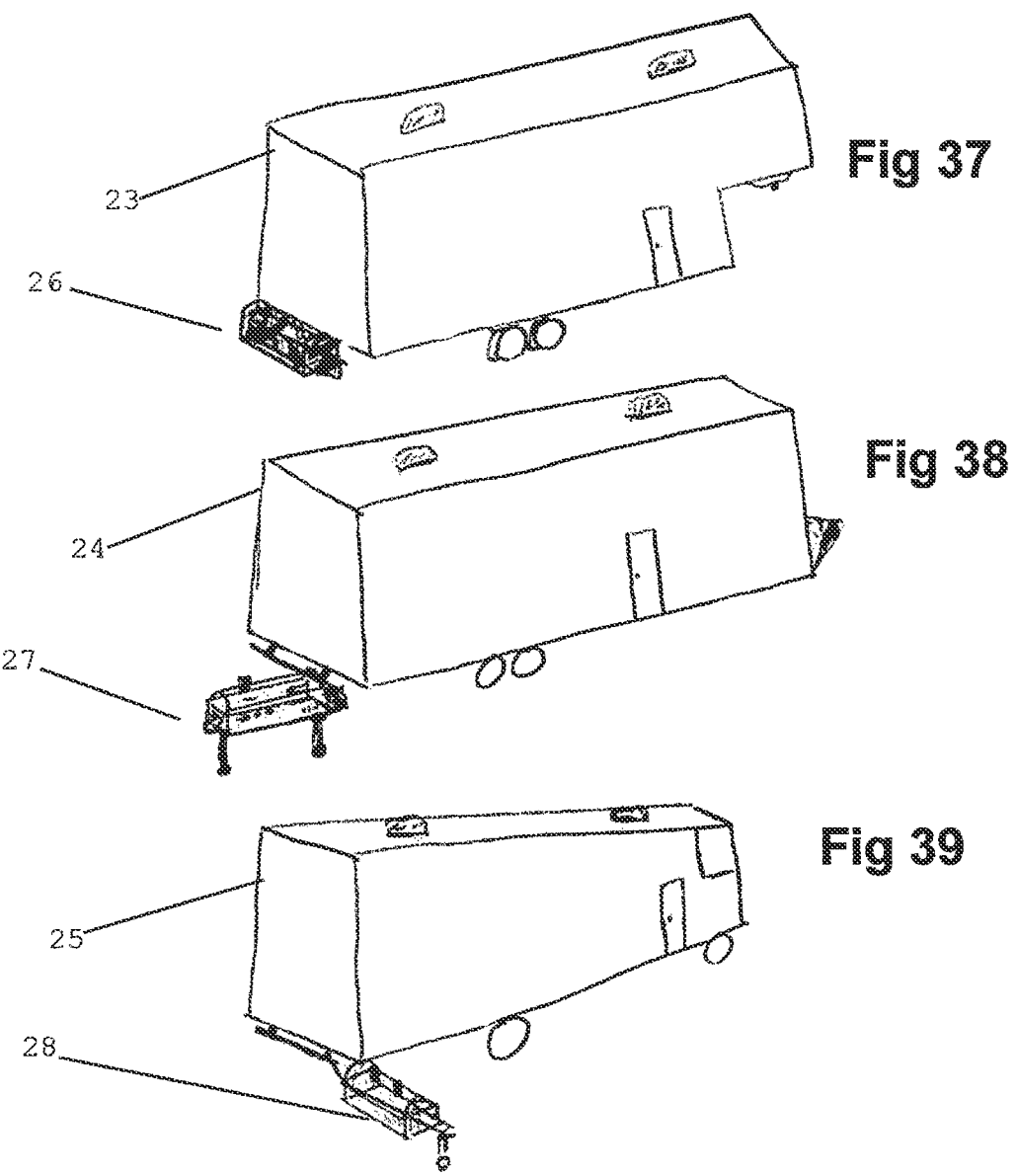

SWING AWAY TAILGATE BARBEQUE COOKING SYSTEM

BACKGROUND OF THE INVENTION

The present invention concerns a mobile cooking apparatus that can be transported by a vehicle or operated as a stand-alone unit at home. When supported by a vehicle, the connection point is at the vehicle mounted hitch receiver. The unit is also capable of swinging away from the vehicle to access the rear of vehicle, position the cooking apparatus for use, or position the unit further away from the vehicle in a location more desirable for cooking.

As an avid tailgater at sporting events and a camping enthusiast, having a device that allowed for cooking in different ways in a tailgating and camping environment was desired. Something more than a simple propane grill or a charcoal grill. Something that offered both cooking options and more. A device that could be transported outside of the vehicle in order to keep grilling odors out of the vehicle, as well as save room in the vehicle for additional items was needed. Also, an outdoor cooking apparatus that was easily operational and could supply enough food for a large crowd of people was desired. Plus, a device that could be easily connected and disconnected to a vehicle or RV. There are small grilling units that can be attached to a vehicle hitch receiver as well as small grilling units that can be permanently or temporarily attached to a recreational vehicle, but none large enough or with the ability to provide multiple cooking options, such as offset smoking, pellet cooking, charcoal grilling, propane grilling, frying, searing or other, in a single unit that can be attached to a vehicle or RV. Additionally, there is a need for a cooking apparatus that can swing away from the carry vehicle to provide access to the rear of the vehicle, to provide added distance from the vehicle for cooking, and to create a cooking space in a more favorable position at campsites or tailgating environments. Again, there are small grilling units that would swing away from the vehicle, but none large enough to provide the cooking area desired to feed a crowd. Plus, these small swing away units do not offer multiple cooking options. There was a need to find a cooking device that could not only be in use while connected to a vehicle or RV, but could also be in use at home as a stand-alone cooking unit. None of the previous art found has a cooking apparatus with the size and mobility described herein that can function as a stand-alone cooking unit as well as a mobile, swing away cooking unit mounted on a vehicle or RV.

Previously, various devices have been used and proposed to carry a cooking apparatus, such as a grill, on the exterior of a vehicle. Many of these previous suggestions that provide similar swing-away characteristics are much smaller in cooking capacity, and are not designed to be a stand-alone cooking units. Additionally, these suggestions require manual lifting to remove the units from the vehicle, therefore, limiting the size and weight of the unit.

Previously, suggested devices used for cooking do not provide an easy detachment means from the vehicle. Most of the suggestions require for the unit to be carried by hand and connected or disconnected to the hitch receiver while manually holding the entire unit. Having the user align the connections while carrying the unit can be very difficult, cumbersome, and strenuous. Designing a device with larger cooking capacities that could be easily removed from a vehicle by a single person without having to lift the entire unit is needed.

Additionally, previously suggested devices have further limitations and shortcomings. Some of these limitations and shortcomings include: they tend to obstruct the opening and closing of a rear door or tailgate, tend to allow excessive play or twisting by the frame assembly and device, are unable to quickly and easily attach or remove the device from vehicle, are unable to position the device on a level plane when parked on uneven ground, do not provide enough cooking area to support a large gathering, are unable to use the device when not attached to a vehicle. The present invention eliminates the above mentioned limitations and shortcomings.

The prior art discloses a number of hitch supported pieces for uses that include cargo carry and cooking purposes. Some improvements to prior art include: added stability by using two connection points to the mounted hitch receiver on recreational vehicles, the ability to easily disconnect the unit by one person due to the adjustable legs with wheels on the unit, the ability to swing heavier loads due to the added ground support of the adjustable legs with wheels, ability to use as a stand-alone cooking apparatus, flexible mounting of the cooking apparatus to be positioned either facing in the forward or rearward direction of the vehicle when mounted for travel, telescoping arm to extend the cooking unit further away from the vehicle, folding shanks on connecting arms to make the unit more compact for storage or stand-alone use.

In summary, prior art provided no suggestions that could provide a cooking apparatus with the desired size and mobility to use in tailgating and camping environments with the advantages, benefits, or improvements as the present invention.

SUMMARY OF THE INVENTION

The objective of the present invention is to provide the ability to transport a cooking apparatus that is larger and heavier than any existing cooking devices currently suggested. The present invention provides a product with more cooking capacity and options for camping and tailgating than any previous suggestion. The present invention can be used in a mobile mode while attached to a vehicle, or in a stand-alone mode that can be utilized at home or remote location. The present invention is easily transported from one location to another with the ability to be attached or detached from a vehicle by a single person. Additionally, the present invention incorporates elements that enable positioning the unit in a plurality of orientations and on uneven terrain.

Some elements of the supporting assembly for the cooking apparatus includes support members, rotational capabilities, and adjustable to provide, in combination, maneuvering capabilities for the cooking apparatus to be positioned in a plurality of orientations to the carry vehicle, to adjust the elevation of the unit for connection to vehicles of different heights, to level the cooking apparatus for use, to provide support and maneuverability, to connect and disconnect the unit from the carry vehicle, and to support and attach the unit to the carry vehicle for transportation.

In some embodiments, the present disclosure provides a method of mounting a swing away tailgate barbeque cooking system to a vehicle comprising at least one vehicle hitch, the method comprising one or more of the following steps: a) providing a vehicle that may comprise at least one vehicle hitch; b) providing a swing away tailgate barbeque cooking system that may comprise: i) at least one connecting arm (which may be comprised of one or more pieces) that may comprise a forward end configured to connect to the at least one vehicle hitch, a rear end and a length extending from the forward end to the rear end; ii) a mounting arm (which may be comprised of one or more pieces) that may comprise a first portion located rearwardly relative to the at least one connecting arm and connected to the at least one connecting arm rear end, the mounting arm optionally further comprising a second portion extending rearwardly from the first portion; iii) a swing away arm (which may be comprised of one or more pieces) that may be located rearwardly relative to the mounting arm and pivotably connected to the second portion, the swing away arm optionally configured to pivot about a pivot axis from a storage position in which the swing arm is parallel to and faces the first straight portion to an open position in which the swing arm is does not face the first straight portion; and iv) a support frame that may be configured to support a cooking apparatus, the support frame optionally connected to the swing away arm and configured to pivot with the swing away arm about the pivot axis from the storage position to the open position, wherein the swing away tailgate barbeque cooking system optionally further comprises a plurality of legs extending downwardly from the mounting arm, the swing away arm and/or the support frame, the plurality of legs optionally comprising caster wheels configured to roll along the ground, the caster wheels optionally located below the mounting arm, the swing away arm and the support frame; and c) removably connecting the forward end of the at least one connecting arm to the at least one trailer hitch so that the at least one connecting arm extends rearwardly from the at least one trailer hitch.

Optionally, the support frame comprises a floor configured to support a cooking apparatus and plurality of sidewalls extending upwardly from the floor. The floor can be partially open (as shown in the illustrations) or fully closed. In some embodiments, a grease cup may be placed below under an open part of the floor to trap grease created by the cooking apparatus. Optionally, the floor is rectangular in shape. Optionally, the floor comprises a width of at least about 1 foot and a length of at least about two feet. Optionally, the method further comprises positioning a grill or other cooking apparatus on the floor and/or connecting a grill or other cooking apparatus to the floor. Optionally, the floor comprises a front located in front of the swing away arm, a rear located behind the swing away arm, and a width extending from the front to the rear and further wherein the floor width comprises a center located directly above the swing away arm so that the floor is centered on the swing away arm. Optionally, the swing away arm is comprised of a fixed portion pivotably connected to the second portion and a telescoping portion configured to move at least partially along a length of the fixed portion to adjust the length of the swing away arm and further wherein the support frame is connected to the telescoping portion. Optionally, the swing away arm and mounting arm and the bottom of the frame are located above the forward end of the at least one connecting arm. Optionally, the swing away arm, the first portion of the mounting arm and the second portion of the mounting arm are co-planar (located in the same substantially horizontal plane) and the bottom of the frame is located above the swing away arm and mounting arm. Optionally, the at least one connecting arm is located below the swing away arm, the first portion of the mounting arm and the second portion of the mounting arm. Optionally, the method further comprises rolling the caster wheels along the ground. Optionally, the frame bottom is configured to hold at least thirty pounds, more preferably at least one hundred pounds. Optionally, the plurality of legs are removably connected to sockets located on the mounting arm, the swing away arm and/or the support frame. Optionally, the method further comprises removing the plurality of legs from the sockets and attaching a plurality of adjustment posts/jacks to the sockets, the plurality of adjustment posts/jacks having a variable height and a flat bottom configured to rest on the ground, the plurality of adjustment posts/jacks configured to raise and lower the mounting arm, swing away arm and/or support frame. Optionally, the swing away tailgate barbeque cooking system further comprises a lock configured to maintain the swing away arm in the storage position. Optionally, the lock comprises a lip located on the swing away arm that is configured to releasably engage the mounting arm. Optionally, the lock comprises a locking pin. Optionally, the lock comprises a bar extending forwardly from the swing away arm and comprising a front portion configured to engage and connect to the mounting arm when the swing away arm is in the storage position. Optionally, the swing away arm and the mounting arm each comprise a top, a bottom, and a height extending from the top to the bottom, and further wherein the pivot axis is a parallel to the height of the swing away arm and the mounting arm. Optionally, the swing away arm is pivotably connected to the second portion by a pivot bolt extending parallel to the pivot axis. Optionally, the second portion extends rearwardly from the first straight portion at an angle of between about 30 degrees and about 90 degrees. Optionally, the first portion is straight and oriented perpendicular to the length of the at least one connecting arm. Optionally, the second portion comprises a rear end located at least 6 inches to the rear of the first portion. Optionally, the first portion comprises a left side, a right side and a length extending from the left side to the right side and further wherein the second portion extends rearwardly from the left side or the right side. Optionally, the plurality of legs are pivotably connected to the mounting arm, the swing away arm and/or the support frame and are configured to pivot from a wheeling position in which the plurality of legs are perpendicular to the ground and the caster wheels contact the ground to a leg storage position in which the plurality of legs are not perpendicular to the ground and the caster wheels are not on the ground. Optionally, each leg comprises a caster wheel. Optionally, the at least one connecting arm, the mounting arm and/or the swing away arm are comprised of a plurality of parts. Optionally, the vehicle hitch is a vehicle hitch receiver and the at least one connecting arm is configured to slide into the vehicle hitch receiver. Optionally, the caster wheels are configured to support at least the mounting arm, the swing away arm and the support frame when the at least one connecting arm is not attached to the vehicle (standalone use). Optionally, the connecting arm and the swing away arm each have a length of at least about two feet. Optionally, the swing away tailgate barbeque cooking system further comprises a plurality of cranks coupled to the plurality of legs and configured to raise and lower the height of the plurality of legs. Optionally, the plurality of legs comprises at least two front legs and at least two rear legs. Optionally, in the storage position, the front legs are located approximately the same distance behind the vehicle, and the rear legs are located approximately the same distance behind the front legs. Optionally, the swing away tailgate barbeque cooking system further comprises a secondary vehicle hitch connecting to the mounting arm for allowing the vehicle to tow a secondary vehicle, the secondary vehicle hitch located below the swing away arm.

Numerous other features, objects, improvements, and functionality of the present invention will be readily apparent to those of ordinary skill in the art upon a reading of the following detailed description of the presently preferred, but nonetheless illustrative, embodiments of the present invention when taken in conjunction with the accompanying drawings. In this respect, it is to be understood that the invention is not limited in its application to the details of construction and to the arrangements of the components set forth in the following description or illustrations. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the objectives of the present invention. Therefore, it is important that the claims be regarded as including such constructions insofar as they do not depart from the spirit and scope of the present invention.

BRIEF DESCRIPTION OF THE DRAWINGS

FIG. 1 is a detailed view of an embodiment in a 90 degree swing out position detailing how the unit is connected to a vehicle hitch receiver and attachments for support.

FIG. 2 is a detailed view of an embodiment in a 90 degree swing out position while extended via a telescoping feature.

FIG. 3 is an explosion view of an embodiment detailing the elements and sections.

FIG. 4 is an explosion view of an embodiment detailing elements and sections of FIG. 3 to include additional features of a folding connecting shank and a hitch receiver extension.

FIG. 5 is an explosion view of an embodiment detailing elements and sections of FIG. 4 to include an additional telescoping feature.

FIG. 10 is a top view of an embodiment also referred to as method 100 detailing elements and connecting point for this embodiment in a stand-alone mode, not connected to a carry vehicle.

FIG. 11 is an above and angled view of FIG. 10 to provide a another view of the elements and connecting points for clarity and understanding.

FIG. 12 is a view from the front perspective of FIG. 10 showing the elements and connecting points for clarity and understanding.

FIG. 13 is a side view of FIG. 10 showing the elements and connecting points for clarity and understanding.

FIG. 14 is an above angled view of an embodiment also referred to as method 200 in a stand-alone mode detailing elements and connecting points.

FIG. 15 is an explosion view of FIG. 14 sections 1, 2, and adjustable legs showing elements and connecting points for clarity and understanding.

FIG. 16 is an above angled view of FIG. 14 excluding the cooking apparatus for clarity and understanding of elements and connecting points.

FIG. 17 is a top view of an embodiment connected to an RV in the traveling mode detailing elements and connecting points.

FIG. 18 is an angled view of an embodiment connected to an RV in the traveling mode with adjustable legs disconnected.

FIG. 19 is a below angled view of an embodiment connected to an RV in the traveling mode detailing the connection points to the carry vehicle.

FIG. 20 is a side view of an embodiment connected to an RV in the traveling mode with adjustable legs connected for maneuvering or stabilizing the cooking apparatus.

FIG. 21 is a rear view of an embodiment connected to an RV in the traveling mode with adjustable legs connected for maneuvering or stabilizing the cooking apparatus.

FIG. 22 is an opposite side view of FIG. 21 to provide clarity and understanding of the elements and connecting points.

FIG. 27 is a top view of an embodiment connected to an SUV in the traveling mode detailing elements and connection points including the vehicle receiver hitch and connecting bar.

FIG. 28 is an above angled view of FIG. 27 for added clarity and understanding of the elements and connection points.

FIG. 29 is a below angled view of FIG. 28 for added clarity and understanding of the elements and connection points.

FIG. 30 is a driver's side view of FIG. 27 for added clarity and understanding of the elements and connection points.

FIG. 31 is a rear view of FIG. 27 detailing location of vehicle hitch receiver.

FIG. 32 is a passenger's side view of FIG. 27 for added clarity and understanding of the elements and connection points.

FIG. 37 is to illustrate an embodiment in the traveling mode connected to a 5th wheel camper trailer.

FIG. 38 is to illustrate an embodiment connected to a travel trailer with the cooking apparatus swung out in a 90 degree position and set up for cooking.

FIG. 39 is to illustrate an embodiment connected to a motorhome with the cooking apparatus swung out in a 180 degree position and set up for cooking.

DETAILED DESCRIPTION

Figure 7:
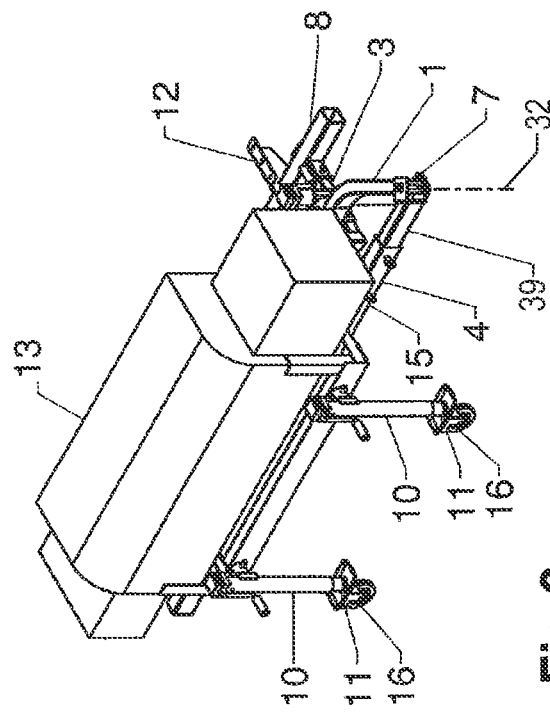
FIG. 7 is an above and angled view of FIG. 6 to provide a another view of the elements and connecting points for clarity and understanding.
Figure 9:
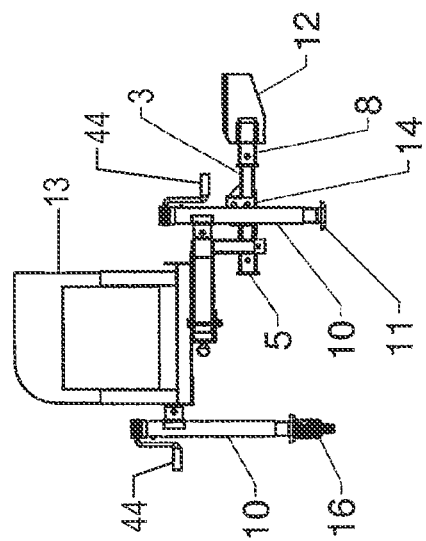
FIG. 9 is a side view of FIG. 6 showing the elements and connecting points for clarity and understanding.

The Swing Away tailgate BBQ System is to be used as a mobile cooking unit, typically used for tailgating, camping, food trucks, on-site catering, and other events that will enable the user to easily transport and set up a cooking unit. It is also intended for use at home as a stand-alone cooking unit that can be placed on a home deck or patio for example. The ease of connecting and disconnecting also make this a simple addition to a vehicle or RV that can be disconnected and stored for winterization or other storage purposes. The dual functionality of a mobile and stand-alone cooking unit is one of the benefits of the Swing Away Tailgate BBQ System. This and other benefits of one or more aspects will become apparent from a consideration of the ensuing description, operation, and accompanying drawings.

For the purposes of promoting an understanding of the principles of the invention and presenting the currently understood modes of operation, reference will now be made to the embodiments illustrated in the drawings and specific language will be used to describe the same. It will be understood that no limitation of the scope of the invention is intended, with such alterations and further modifications in the illustrated device and such further applications of the principles of the invention as illustrated therein being contemplated as would normally occur to one skilled in the art to which the invention relates.

Several different embodiments of the present invention are illustrated in the drawings and narration. One embodiment for trucks, SUVs, and other vehicles with standard widths is also referred to as method 200. Another embodiment that would be for recreational vehicles, food trucks, or any vehicles or trailers that are wider than conventional pickup trucks, SUVs and motor vehicles is referred to as method 100. One distinction between these two embodiments is that method 100, for wider vehicles, will have two or more supporting members, referred to as connecting arms 3, that connect to the carry vehicle. Method 200, for vehicles such as pickup trucks and SUVs will have a single connecting arm 3 used to connect to the vehicle's center receiver hitch. Another embodiment is referred to as method 300 and includes a telescoping feature that can be incorporated into both method 100 and method 200 embodiments. It should also be understood that any feature described applies to all embodiments.

The Swing Away Tailgate BBQ Cooking System comprises a base frame that is described in three sections, 1st section, 2nd section, and 3rd section. A 4th section will also be described that includes the embodiments of the vehicle connecting attachment. The 1st section comprises of the mounting arm 1, connecting arms 3, lock 18, and attachments. Section 2 comprises a swing away arm 2, cooking apparatus support frame 20, connections for adjustable legs 9, pivot point 7, pivot bolt 19, and attachments. Section 1 and Section 2 are pivotally attached together on one end at the pivot point 7. Section 1 and Section 2 are joined together on the other end by a lock 18 that is releasable. Section 3 is comprised of the cooking apparatus 13 and attachments. Sections 1, 2 and 3 joined together comprise a stand-alone cooking unit. FIG. 14 illustrates method 200 with sections 1, 2, and 3 together with adjustable legs 10 connected to the support frame 20 in the stand-alone mode. FIG. 16 illustrates method 200 sections 1 and 2 only. FIG. 15 illustrates an explosion view with section 1 detached from section 2, along with the adjustable legs 10 detached from section 2. FIG. 15 shows the connections for adjustable legs 9 joined with the support frame 20 for this embodiment. FIG. 14 provides a view of method 200 assembled. FIG. 15 provides a view of elements of method 200 detached from each other for a better understanding of the arrangement. FIG. 14 and FIG. 16 illustrate method 200 in the stand-alone mode to which the lock 18 secures sections 1 and 2 together. Section 3, is secured to section 2 at a plurality of points on the support frame 20. FIG. 14-16 illustrate elements of an embodiment, method 100, in the stand-alone mode.

Figure 34:
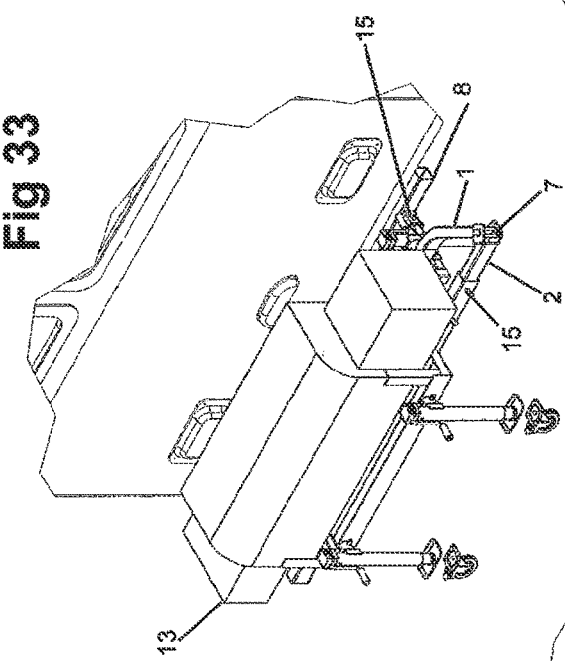
FIG. 34 is an above angled view from the driver's side of FIG. 33 for added clarity and understanding of the elements and connection points.
Figure 35:
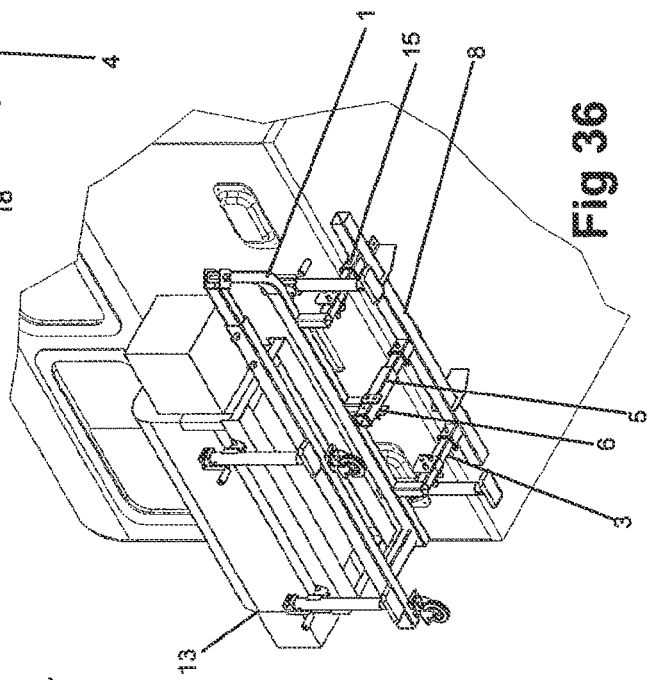
FIG. 35 is a below angled view from the driver's side of FIG. 33 for added clarity and understanding of the elements and connection points.
Figure 36:
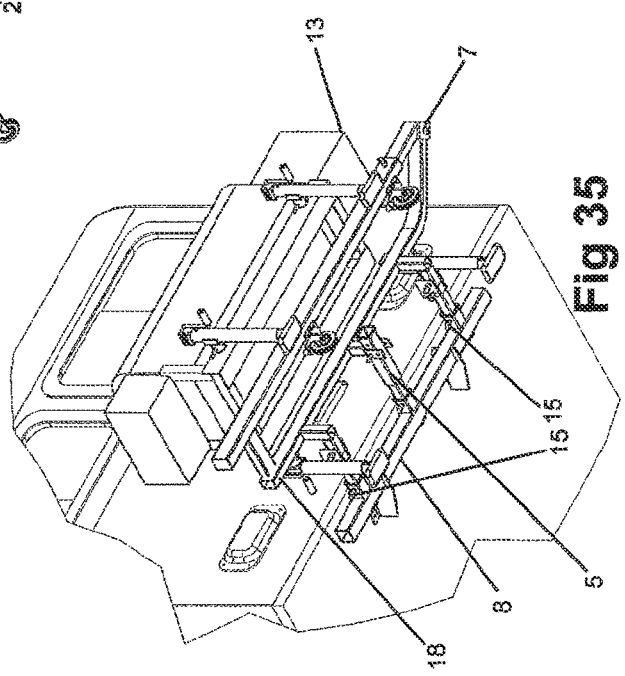
FIG. 36 is a below angled view from the passenger's side of FIG. 33 for added clarity and understanding of the elements and connection points.

FIG. 10-13 illustrate various views of method 100 with sections 1, 2, and 3 joined together with adjustable legs 10 connected in the stand-alone mode. FIG. 10 illustrates an overhead view with adjustable legs 10 connecting to the mounting arm 1 on the side where the unit would connect to a vehicle via the connecting arms 3. FIG. 11 illustrates an overhead angled view with the adjustable legs 10 connected to the support frame 20 on the side of the unit opposite the connecting arms 3. The adjustable legs 10 are joined to each member via the connection for adjustable legs 9. The connections for adjustable legs 9 are shown in more detail in FIG. 5 for this embodiment. FIG. 11 and FIG. 34 illustrate that the adjustable legs 10 can attach either a wheel 16 (such as a caster wheel) or a flat foot 17 at the base for maneuvering or stabilization. The wheel 16 or flat foot 17 is secured to the telescoping leg 11 with a pin. FIG. 12 illustrates that each adjustable leg 10 has a rotating handle 21 and a telescoping leg 11 for height adjustments. FIG. 10-13 illustrate elements of an embodiment, method 100, in the stand-alone mode.

The 4th section is mounted to the vehicle and used to connect Sections 1, 2, and 3 to the vehicle for transportation and use in a mobile mode for tailgating, camping, and cooking in a mobile location. Section 4 is the element of one embodiment used to connect a stand-alone cooking system to a vehicle or trailer. A vehicle hitch 8 (also referred to herein as a vehicle hitch receiver) is detailed herein. As known to those of ordinary skill and described in U.S. Pat. No. 7,591,404 (the contents of which are incorporated by reference in their entirety), there are a variety of types of vehicle hitches. Other embodiments could be secured to other parts of the carry vehicle body, such as directly to the frame or bumper.

FIG. 3 illustrates one embodiment with sections 1, 2, and 4 in an explosion view to separate each section for a better explanation of the arrangements. FIG. 3 is an embodiment of method 100 with two connecting arms 3. FIG. 3 includes a vehicle hitch receiver 8 with three female receiver hitch couplers. The center female receiver hitch coupler would typically be located in the center of the vehicle's frame. Section 1 mates with section 4, vehicle hitch receiver 8, when the connecting arms 3 are inserted into the vehicle hitch receiver 8. Each union is secured with a locking pin 15. FIG. 33-36 illustrate various views of locking pins 15 securing the connecting arms 3 to the vehicle hitch receiver 8. Securing and supporting the unit to a carry vehicle in this manner, with two connecting arms 3, allows for the vehicle's center receiver hitch to be used for other purposes, such as flat towing another vehicle. Many RVs will pull behind them a smaller vehicle with all four wheels on the road, also known as flat towing. FIG. 1-2, FIG. 4-5, FIG. 23-26, and FIG. 35-36 illustrate embodiments with the center receiver hitch extension 5 available for other towing or vehicle connections. FIG. 1-5 show the support for center hitch receiver extension 6, which is to provide added stability for the center receiver extension 5. Additionally, having two connecting arms 3 adds strength, support, and stability to the entire system when traveling or when being swung away from the carry vehicle for use.

FIG. 14-16 illustrate an embodiment of method 200 using a single connecting arm 3. FIG. 27-32 also illustrate various views of this embodiment with a single connecting arm 3 mated with a vehicle receiver hitch 8. FIG. 27-32 show method 200 connected to a carry vehicle in the traveling mode with adjustable legs detached from unit. In FIG. 27-32 the entire system is supported to the vehicle hitch receiver 8 by a connecting bar 3. FIG. 14-16 show method 200 in the stand-alone mode with adjustable legs 10 supporting the entire system.

The cooking apparatus 13 can be mounted in two different orientations, either facing the forward direction of the carry vehicle or the rearward direction of the carry vehicle. This will provide functionality for the user to orient the cooking apparatus 13 in the manner that is most desirable to the user. For example, the cooking apparatus 13 can be mounted facing the forward direction of the carry vehicle so that it can be swung out from the traveling position and used in a tailgating orientation, so that the user can stand behind the carry vehicle and cook. FIG. 2 illustrates a 90 degree orientation in which the front of the cooking apparatus 13 is positioned so that the user can stand behind the carry vehicle and cook. In FIG. 2, to illustrate this it should be noted the vehicle hitch receiver 8 would be mounted at the rear of a vehicle or RV. The cooking apparatus 13 can also be mounted facing the rearward direction of the carry vehicle so that it can be swung out from the traveling position and used in a camping orientation, so that the user can stand along the side of the carry vehicle and cook. FIG. 1 illustrates a 90 degree orientation in which the front of the cooking apparatus 13 is positioned so that the user can stand to the side of the carry vehicle and cook. In FIG. 1, to illustrate this it should be noted the vehicle hitch receiver 8 would be mounted at the rear of a vehicle or RV. It should also be noted that FIG. 1 and FIG. 2 show the cooking apparatus 13 at approximately a 90 degree rotation from the traveling position. The cooking apparatus 13 can rotate more or less than these illustrations show, up to approximately 180 degrees from the traveling position.

Another embodiment includes a telescoping feature allowing the cooking apparatus 13 to be extended further away from the carry vehicle when connected and swung out for use. This embodiment is also referred to as method 300. The telescoping feature of method 300 can be incorporated into method 100, method 200, or any other embodiment. The telescoping feature will allow the cooking apparatus 13 to be extended further away from the pivot point 7 and the carry vehicle when pivoting away and into position for use. FIG. 1-2 and FIG. 5 illustrate elements of method 300. One improvement this embodiment includes is a telescoping bar 4. In such embodiment, the swing away arm 2 may be comprised of a fixed portion and the telescoping bar 4. Optionally, the telescoping bar has inner dimensions greater than the outer dimension of the fixed portion so that the fixed portion will fit within the channel of the telescoping bar 4. In the method 300 embodiment, the support frame 20 and attachments are mounted on the telescoping bar 4. The fixed portion inserts inside the telescoping bar 4 when in the traveling or stand-alone modes. The fixed portion and the telescoping bar 4 are secured in place with a locking pin 15. FIG. 1 illustrates method 300 incorporated into method 200 in a 90 degree swing out position, but not extended via the telescoping feature. In FIG. 1, the telescoping bar 4 is retracted and secured in place with a lock such as a locking pin 15. In FIG. 1, the fixed portion is fully inserted into the telescoping bar 4. FIG. 2 illustrates method 300 incorporated into method 200 in a 90 degree swing out position, and extended further away from the pivot point 7 and the vehicle receiver hitch 8. In FIG. 2, the telescoping bar 4 is extended and secured in place with a locking pin 15. FIG. 2 illustrates how a plurality of holes in the fixed portion can be used to secure the cooking apparatus 13 into a plurality of extended lengths from the pivot point 7. It should be noted that FIG. 1 and FIG. 2 illustrate the telescoping feature of method 300 in a 90 degree pivoted position, and this feature can be utilized in a lesser or greater degree pivoted position. FIG. 5 provides an explosion view of the telescoping feature incorporated into method 200 for a better understanding of the arrangements. In FIG. 5, the fixed portion with a plurality of holes inserts inside the telescoping bar 4 when assembled for use. In FIG. 5, the fixed portion is secured to the mounting arm 1 at the pivot point 7 with a pivot bolt on one end. In FIG. 5, the telescoping bar 4, with the fixed portion inserted, is secured to the mounting arm 1 on the other end with the locking mechanism 18.

The adjustable legs 10 are another feature of the embodiments that allow for easy disconnection from a carry vehicle, support for the system in the stand-alone mode, support for the system when swung away for use tailgating or camping, and leveling the cooking apparatus 13 in whichever mode or position it is in. The adjustable legs 10 can be disconnected from the system for traveling. FIG. 23-26 illustrate one embodiment in the traveling mode with the adjustable legs 10 disconnected and not shown. FIG. 33-36 illustrate one embodiment in the traveling mode with the adjustable legs 10 connected to the system. It should be noted the adjustable legs 10 can be connected to the system in an orientation perpendicular to the ground for support. The adjustable legs 10 can also be connected to the system in an orientation that is parallel to the ground for traveling. The connection for adjustable legs 9 has four holes that allow for a locking pin 15 to secure the adjustable leg 10 in an orientation that is perpendicular or parallel to the ground.

The locking mechanism 18 can have a plurality of designs to secure the mounting arm 1 with the swing away arm 2. One embodiment of the locking mechanism 18 illustrated in FIG. 15 is made by a pin 46 and threaded bolt screw 47. When the system is secured in place for transportation, there is a lip 22 on the swing away arm that extends slightly toward the vehicle. This lip 22 inserts into the mounting arm 1 through a hole and is secured by a spring mechanism. A bolt screw 47 is then tightened through the mounting arm and into the swing away arm to provide a multi-point locking mechanism 18. It should be noted that other embodiments could use an alternate locking mechanism to secure the system.

The cooking apparatus 13 is illustrated throughout the drawings in various ornamental designs. It should be noted that the cooking apparatus 13 has a plurality of designs and fuel types. The cooking apparatus 13 could utilize a single fuel source, such as propane. The cooking apparatus 13 could also utilize a plurality of fuel sources, such as propane, charcoal, smoke, electric, wood, wood pellets, or other means. The scope and spirit of the invention is to provide a plurality of models designed for the cooking needs of the end user. Therefore, embodiments will have cooking apparatus' with different ornamental designs and fuel sources.

Figure 6:
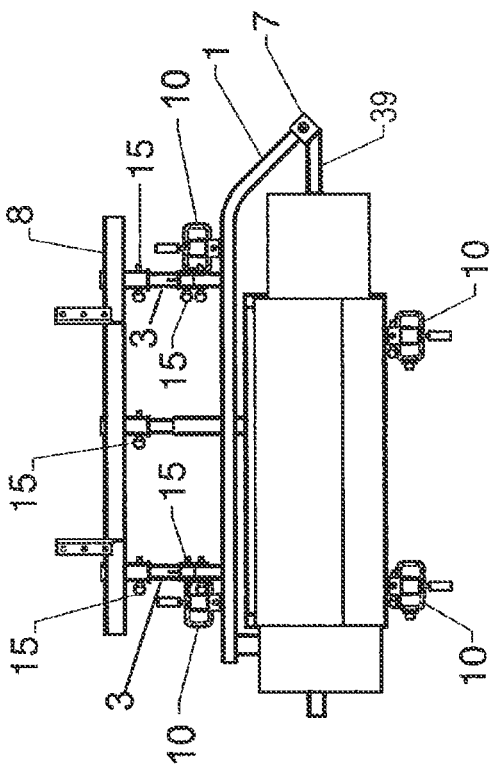
FIG. 6 is a top view of an embodiment also referred to as method 100 detailing elements and connecting points that include a vehicle receiver hitch for a carry vehicle.
Figure 8:
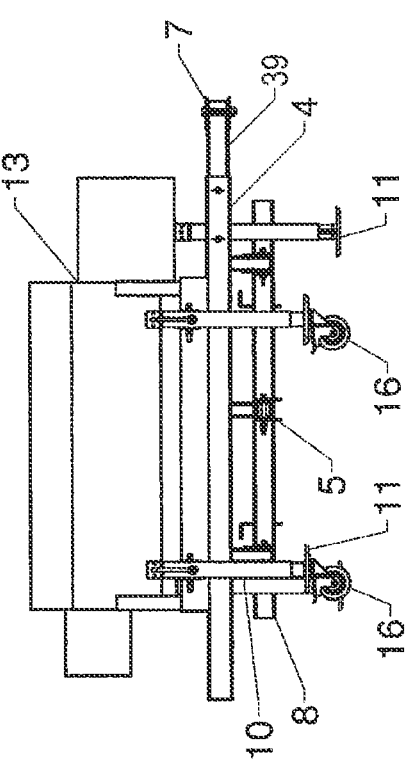
FIG. 8 is a view from the rear perspective of FIG. 6 showing the elements and connecting points for clarity and understanding.
Figure 24:
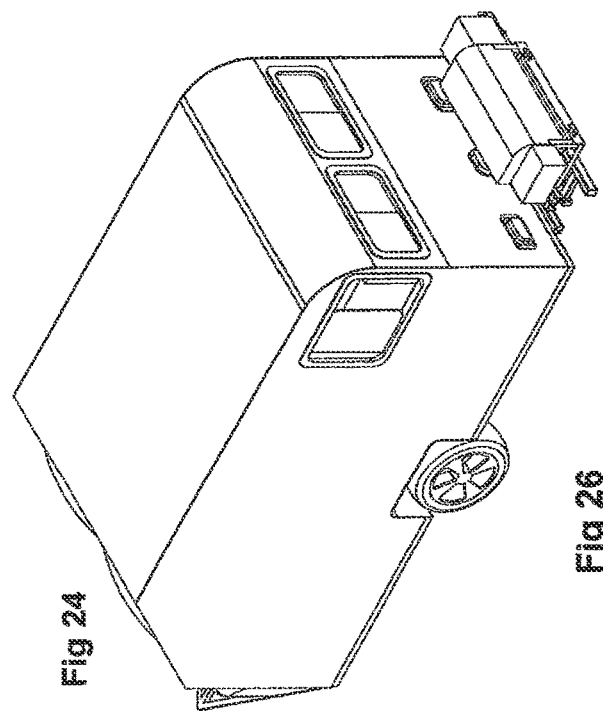
FIG. 24 is an above angled view of FIG. 23 for added clarity and understanding.
Figure 26:
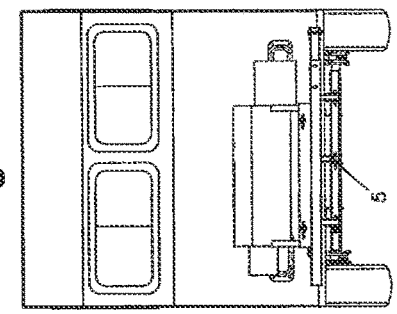
FIG. 26 is a rear view of FIG. 23 for added clarity and understanding.
Figure 23:
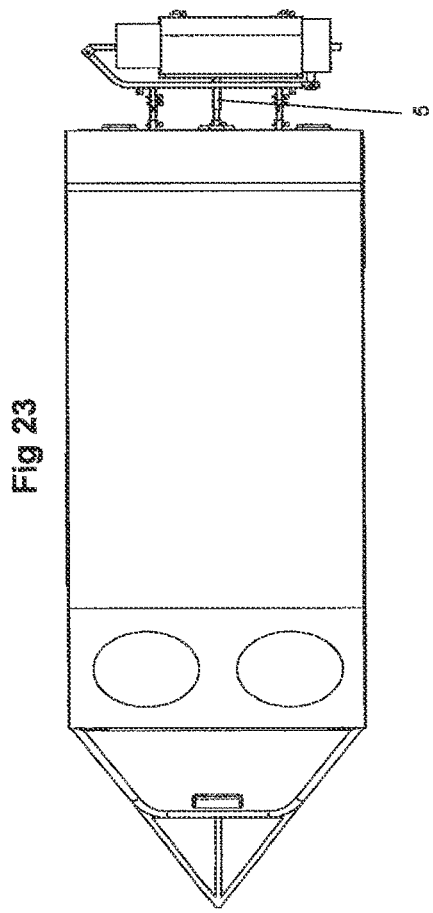
FIG. 23 is a top view of an embodiment connected to an RV in the traveling mode detailing the center receiver hitch extension.
Figure 25:
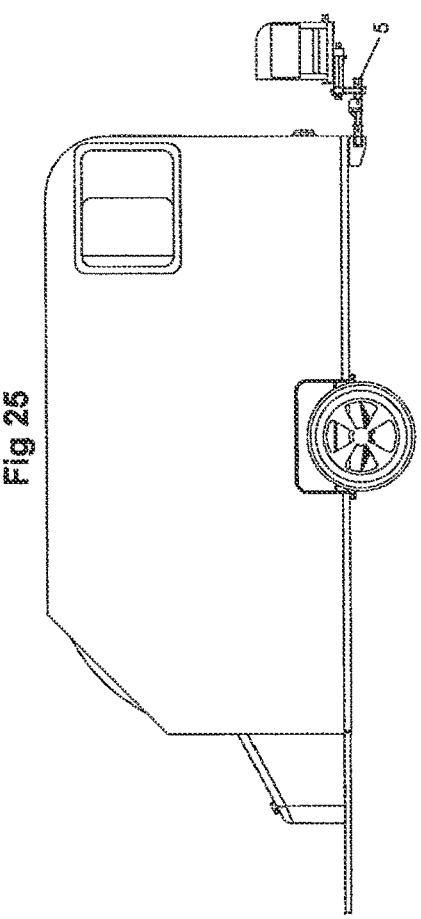
FIG. 25 is a side view of FIG. 23 for added clarity and understanding.
Figure 33:
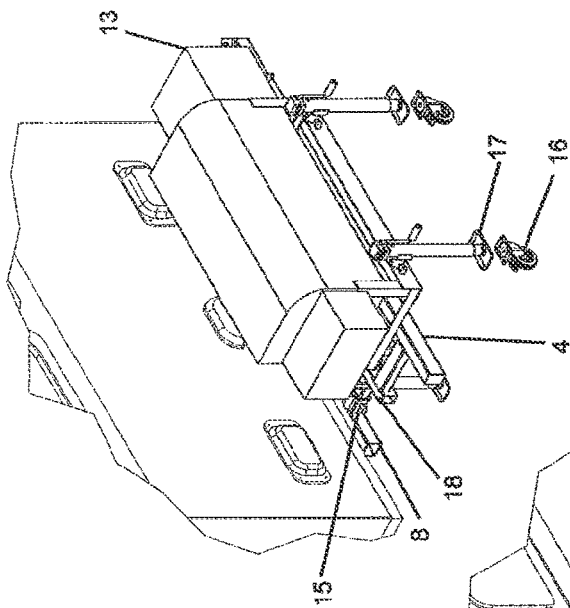
FIG. 33 is an above angled view from the passenger's side of an embodiment connected to an RV in the traveling mode detailing elements and connecting points.

To connect the unit to a carry vehicle, the user will maneuver the unit from the stand-alone position, illustrated in FIG. 11, to the carry vehicle hitch receiver 8, which will typically be at the rear of the carry vehicle, but could also be at the front if connection points are mounted in the front of the carry vehicle. The connecting arms 3 will be aligned to the vehicle receiver hitch 8 female couplers by using the adjustable legs 10 to elevate the cooking system to match the elevation of the carry vehicle receiver hitch 8 female couplers. The connecting arms 3 are then mated with the carry vehicle receiver hitch 8 female couplers, which are then secured with a locking pin 15. FIG. 6 illustrates these connections.

Once the system is connected to the vehicle receiver hitch 8 the adjustable legs 10 are then retracted so that the cooking system is fully supported by the carry vehicle at the vehicle hitch receiver 8. The adjustable legs 10 are then either rotated parallel to the ground or detached from the cooking system. The adjustable legs 10 are mated to the cooking system with round male and female unions, secured in either a parallel or perpendicular orientation to the ground by a locking pin 15. Once all adjustable legs 10 are no longer joined with the cooking system and in a perpendicular orientation to the ground, the cooking system is ready to be transported by the carry vehicle.

Once the carry vehicle has arrived and is parked in a camping or tailgating type of location, the cooking apparatus 13 can be positioned in various orientations for cooking. The cooking apparatus 13 can be kept in the traveling mode and utilized for cooking. Or, the cooking apparatus 13 can be released from the traveling mode and pivoted away from the vehicle into a more favorable position. To pivot the cooking apparatus, an adjustable leg 10 can be secured to a connection for the adjustable leg 9 and lowered until the wheel 16 attached to the adjustable leg 10 is in contact with the ground. Next, the locking mechanism 18 is released. The cooking apparatus is then rotated away from the vehicle to the desired position. Examples of embodiments that position the cooking apparatus 13 in 90 degree pivoted positions are shown in FIG. 1-2. FIG. 37-39 are intended to illustrate an embodiment in various pivoted positions on various carry vehicles. Once in the desired position, the cooking apparatus height can be adjusted by one or more of the adjustable legs 10 to a level orientation for use. Additional adjustable legs 10 can by utilized to provide additional stability or height adjustments. It should be noted that stabilization, height adjustments, and usage of adjustable legs 10 will vary depending on the embodiment, user, and location. For example, some instances and embodiments will have no need to secure an adjustable leg for pivoting, as the pivot point 7 will support the cooking apparatus 13 and swing away arm 2. Other instances and embodiments will need the support of one or more adjustable legs 10 to pivot, level or stabilize the cooking apparatus 13. Due to the mobility of the cooking system, each location the unit is carried to will present different needs for pivoting, leveling, stabilizing and securing the cooking apparatus 13 for use. Therefore, it should be mentioned the steps described are optional and can be carried out in many different orders according to the need of the user.

The adjustable legs 10 are used to raise and lower the unit. This allows for the unit to be connected and disconnected on uneven ground. It also allows for the unit to be easily leveled when positioned for cooking in a tailgating or camping location. Due to the adjustable legs 10, the ability to position the unit is greatly enhanced. One or more of the adjustable legs 10 can be used to raise or lower the cooking unit to level the unit for optimal cooking performance. More adjustable legs 10 can be used to provide more stability if needed to the unit when in a swing out position, as shown in FIG. 1-2.

It will be necessary to have a plurality of embodiments to meet the specifications of different types of vehicles. For example, embodiments for larger recreational vehicles will have lengthier mounting arms 1 and swing away arms 2 for pivot clearance due to the vehicles being wider than trucks and SUVs. Embodiments for use on trucks and SUV's will not have as lengthy mounting arm 1 and swing away arms 2 due to their width. The need for different embodiments is primarily, but not exclusively, based on the width of the vehicle, any slide outs the unit may have, cargo bay doors, weight capacity limitations, and orientations the user desires to position the cooking apparatus 13 in.

Another embodiment of the system, shown in FIG. 2, has the ability to extend the cooking apparatus 13 further from the vehicle by pulling a locking pin 15 out of the fixed portion and the telescoping bar 4, to allow for additional extension of the cooking apparatus 13. The cooking apparatus 13 can then be extended even further away from the vehicle or RV. The fixed portion and the telescoping bar 4 are secured with a locking pin 15 through holes in each component. A plurality of holes on the telescoping arm 4 are spaced according to the desired telescoping distance. This embodiment is an optional design upgrade and can be incorporated into other embodiments. One of several benefits of the telescoping feature is the ability to position the cooking apparatus 13 even further away from the vehicle while still connected, which some users may prefer. For example, some recreational vehicles have slide outs near the back of the vehicle and more clearance from the vehicle is desired. Furthermore, some RVs have folding rear platforms that create outdoor decks or ramps for loading bikes and other toys. They are commonly referred to as toy haulers. Positioning the cooking apparatus 13 along the side of the RV can provide clearance to utilize the RV's deck or ramp. An additional benefit of the telescoping feature is that some users may desire for the heat generated when cooking to be further away from the vehicle.

In other embodiments, folding mechanism 14 for connecting arms 3, are included to allow movement/pivoting of pieces of the connecting arms 3. One feature of the folding mechanism 14 for the connecting arms 3, is the capability to rotate the connecting arms 3 and free up space when the system is in the stand-alone mode. For example, in the illustrated embodiment of FIG. 5, the middle segment/piece folds relative to the rear segment/piece of the same connecting arm via folding mechanism/hinge 14. In other words, the connecting arms 3 may be comprised of a plurality of segments, including one segment that folds/hinges relative to the other segments for storage. Once disconnected from a carry vehicle, folding the connecting arms 3 allow for more clearance for storage or use as a stand-alone system. FIG. 4-5 illustrate the folding mechanism 14 for connecting arms 3 in one embodiment that allows for pivoting 90 degrees upward. Other embodiments could pivot connecting arms 3 downward or to the side. Other embodiments could allow for a portion or the entire connecting arm 3 to be disconnected.

Optionally, the rear ends of the connecting arms is higher than the forward ends, as shown in FIGS. 3, and 14-16. In some embodiments, the connecting arm 3 may curve upwardly as shown in FIG. 3 or alternatively may be angled upwardly.

In another embodiment, the adjustable legs 10 are bonded to the unit and swiveled horizontally or vertically. Horizontally when in the traveling mode, and vertically when needed for support, disconnection, or in the stand-alone mode. One benefit of bonding the adjustable legs to the unit is added security from theft or misplacement of adjustable legs.

Another embodiment to increase or decrease ground clearance would come in the form of mechanical, hydraulic, pneumatic, electric or other means to adjust the elevation of the device. This method of adjustment could apply to the clearance of the device from the carry vehicle, such as raising or lowering the device while connected to the carry vehicle. This method of adjustment could also apply to the adjustable legs 10.

Materials other than that included in the preferred embodiments could be used. Some examples include: tubes or members constructed of plastic or lightweight material; structural injection to increase strength or decrease weight; titanium, aluminum, or other material used to increase strength or decrease weight; hardening of carbon steel; and other known and future alternate materials could be used in other embodiments to provide strength or weight advantages.

Another embodiment could use the carry vehicle body or bumper to mount a cooking system to the carry vehicle. In some cases, vehicle receiver hitches are not mounted to the vehicle frame, rather the receiver hitch is mounted to the bumper or body of the vehicle.

Another embodiment could incorporate a cargo carrier, a cooler, a fuel holder, a bike rack, a kayak rack, or other carry container to the system for added benefits.

In another embodiment, the height of the system relative to the horizontal plane of the vehicle receiver hitch 8 could be altered.

Another embodiment could have a support frame that rotates horizontally to position the front of the cooking apparatus 13 facing the forward direction of the vehicle or the rearward direction of the vehicle. This embodiment would allow the user to orient the cooking apparatus to cook from behind the vehicle or at the side of the vehicle when swung out.

The swing away tailgate barbeque cooking system may be manufactured and provided for sale in a wide variety of sizes and shapes for a wide assortment of applications. After reading the description and illustrations, it should be understood that under appropriate circumstances, such as design preferences, user preferences, vehicle requirements, marketing preferences, cost, materials, technological advances, etc. . . . , other components, elements, and customized parts may be sold or included to achieve the scope and spirit of the invention.

It is thought that advantages will be understood from the foregoing description and it will be apparent that various changes may be made thereto without departing from the spirit and scope of the invention or sacrificing its material advantage. It will be understood that no limitation of the scope and spirit of the invention is intended, with such alterations and further modifications in the illustrated device and such further applications of the principles of the invention as illustrated therein being contemplated as would normally occur to one skilled in the art to which the invention relates. Some examples of obvious modifications include: The number of connection points to the vehicle could be greater than 1 or 2; the size and shape of the mounting, connecting, and supporting bars could be different; the material composition could be different; the size or shape or number of legs could be more or less; the makeup and configuration of the cooking apparatus used could be numerous; the position of the pivot point and where it is located could be on a different plane; multiple pivot points could be used to provide the desired extensions; the connecting bars could rotate or disconnect from the mounting arm; the support frame could be of various sizes, shapes, and configurations to mount to various cooking apparatus'; a hitch receiver for flat towing could be bonded onto the mounting arm instead of extended from the vehicle center receiver hitch; the adjustable legs could be mounted to the unit at different points and in different orientations; the cooking apparatus could be lifted higher via hydraulics, electric or other means to add ground clearance; the assembly could have support members joined to the frame or bumper instead of the hitch receiver; to list a few examples of obvious modifications, but not limited to the afore mentioned modifications.

In the above embodiments, the different elements, features, positions and structures of the present invention are described separately in each of the embodiments. However, it is the full intention that the separate aspects of each embodiment described herein may be combined with the other embodiments. Those skilled in the art will appreciate that the adaptations, alternatives, modifications, and methods of the described embodiments can be configured without departing from the scope and spirit of the invention. Therefore, it is understood that the invention may be practiced other than as specifically described herein.

| Part List | |
|---|---|
| Mounting arm | 1 |
| Mounting arm first portion | 1a |
| Mounting arm second portion | 1b |
| Swing away arm | 2 |
| Connecting arm | 3 |
| Telescoping bar | 4 |
| Center receiver hitch extension/secondary vehicle hitch | 5 |
| Support for center receiver hitch extension | 6 |
| Pivot point | 7 |
| Vehicle receiver hitch | 8 |
| Connection for adjustable legs/socket | 9 |
| Adjustable legs | 10 |
| Telescoping leg | 11 |
| Vehicle Receiver hitch mounting bracket | 12 |
| Cooking apparatus | 13 |
| Folding mechanism for connecting arm | 14 |
| Locking pin | 15 |
| Caster wheel | 16 |
| Flat foot | 17 |
| Locking mechanism | 18 |
| Pivot bolt | 19 |
| Support frame | 20 |
| Rotary handle | 21 |
| Lip | 22 |
| 5th wheel RV trailer | 23 |
| RV travel trailer | 24 |
| RV motorhome | 25 |
| Embodiment in traveling position | 26 |
| Embodiment in 90 degree swing out position | 27 |
| Embodiment in 180 degree swing out position | 28 |
| Connecting arm forward end | 29 |
| Connecting arm rear end | 30 |
| Connecting arm length | 31 |
| Pivot axis | 32 |
| Frame floor (may be partially open) | 33 |
| Frame sidewalls | 34 |
| Floor front | 35 |
| Floor rear | 36 |
| Floor width | 37 |
| Floor width center | 38 |
| Fixed portion | 39 |
| First portion left side | 41 |
| First portion right side | 42 |
| Second portion rear end | 43 |

-continued

| Part List | |
|---|---|
| Crank | 44 |
| Bar | 45 |
| Pin | 46 |
| Threaded bolt screw | 47 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

It will be understood that the components, such as the connecting arm 3, mounting arm 1, and swing away arm 2, can be comprised of one or more parts.

As used herein, the directional terms such as "forward", "rear", "left", "right", "top" and "bottom" are used to describe the components in relation to each other in an exemplary point of view. It will be understood that such terms are not intended to limit the invention to being held in any particular orientation with respect to the viewer.

Terms of degree such as "generally", "substantially", "about", and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method of mounting a swing away tailgate barbeque cooking system to a vehicle comprising at least one vehicle hitch, the method comprising:
   a) providing a vehicle comprising at least one vehicle hitch;
   b) providing a swing away tailgate barbeque cooking system comprising:
      i) at least one connecting arm comprising a forward end configured to connect to the at least one vehicle hitch, a rear end and a length extending from the forward end to the rear end;
      ii) a mounting arm comprising a first portion located rearwardly relative to the at least one connecting arm and connected to the at least one connecting arm rear end, the mounting arm further comprising a second portion extending rearwardly from the first portion;
      iii) a swing away arm located rearwardly relative to the mounting arm and pivotably connected to the second portion, the swing away arm configured to pivot about a pivot axis from a storage position in which the swing arm is parallel to and faces the first portion to an open position in which the swing arm does not face the first straight portion; and
      iv) a support frame configured to support a cooking apparatus, the support frame connected to the swing away arm and configured to pivot with the swing away arm about the pivot axis from the storage position to the open position,
      wherein the swing away tailgate barbeque cooking system further comprises a plurality of legs extending downwardly from the mounting arm, the swing away arm and/or the support frame, the plurality of legs comprising caster wheels configured to roll along the ground, the caster wheels located below the mounting arm, the swing away arm and the support frame; and
   c) removably connecting the forward end of the at least one connecting arm to the at least one trailer hitch so that the at least one connecting arm extends rearwardly from the at least one trailer hitch.

2. The method of claim 1 wherein the support frame comprises a floor configured to support a cooking apparatus and plurality of sidewalls extending upwardly from the floor.

3. The method of claim 2 wherein the floor is rectangular in shape.

4. The method of claim 2 wherein the floor comprises a width of at least about 1 foot and a length of at least about two feet.

5. The method of claim 2 wherein the method further comprises positioning a grill or other cooking apparatus on the floor and/or connecting a grill or other cooking apparatus to the floor.

6. The method of claim 2 wherein the floor comprises a front located in front of the swing away arm, a rear located behind the swing away arm, and a width extending from the front to the rear and further wherein the floor width comprises a center located directly above the swing away arm so that the floor is centered on the swing away arm.

7. The method of claim 1 wherein the swing away arm is comprised of a fixed portion pivotably connected to the second portion and a telescoping portion configured to move at least partially along a length of the fixed portion to adjust the length of the swing away arm and further wherein the support frame is connected to the telescoping portion.

8. The method of claim 1 wherein the swing away arm and mounting arm and the bottom of the frame are located above the forward end of the at least one connecting arm.

9. The method of claim 8 wherein the swing away arm, the first portion of the mounting arm and the second portion of the mounting arm are co-planar and the bottom of the frame is located above the swing away arm and mounting arm.

10. The method of claim 9 wherein the at least one connecting arm is located below the swing away arm, the first portion of the mounting arm and the second portion of the mounting arm.

11. The method of claim 1 wherein the method further comprises rolling the caster wheels along the ground.

12. The method of claim 1 wherein the frame bottom is configured to hold at least thirty pounds.

13. The method of claim 1 wherein the plurality of legs are removably connected to sockets located on the mounting arm, the swing away arm and/or the support frame.

14. The method of claim 13 wherein the method further comprises removing the plurality of legs from the sockets and attaching a plurality of adjustment posts/jacks to the sockets, the plurality of adjustment posts/jacks having a variable height and a flat bottom configured to rest on the ground, the plurality of adjustment posts/jacks configured to raise and lower the mounting arm, swing away arm and/or support frame.

15. The method of claim 1 wherein the swing away tailgate barbeque cooking system further comprises a lock configured to maintain the swing away arm in the storage position.

16. The method of claim 15 wherein the lock comprises a lip located on the swing away arm that is configured to releasably engage the mounting arm.

17. The method of claim 16 wherein the lock comprises a locking pin.

18. The method of claim 15 wherein the lock comprises a bar extending forwardly from the swing away arm and comprising a front portion configured to engage and connect to the mounting arm when the swing away arm is in the storage position.

19. The method of claim 1 wherein the swing away arm and the mounting arm each comprise a top, a bottom, and a height extending from the top to the bottom, and further wherein the pivot axis is a parallel to the height of the swing away arm and the mounting arm.

20. The method of claim 19 wherein the swing away arm is pivotably connected to the second portion by a pivot bolt extending parallel to the pivot axis.

21. The method of claim 1 wherein the second portion extends rearwardly from the first portion at an angle of between about 30 degrees and about 90 degrees.

22. The method of claim 1 wherein the first portion is straight and oriented perpendicular to the length of the at least one connecting arm.

23. The method of claim 1 wherein the second portion comprises a rear end located at least 6 inches to the rear of the first portion.

24. The method of claim 1 wherein the first portion comprises a left side, a right side and a length extending from the left side to the right side and further wherein the second portion extends rearwardly from the left side or the right side.

25. The method of claim 1 wherein the plurality of legs are pivotably connected to the mounting arm, the swing away arm and/or the support frame and are configured to pivot from a wheeling position in which the plurality of legs are perpendicular to the ground and the caster wheels contact the ground to a leg storage position in which the plurality of legs are not perpendicular to the ground and the caster wheels are not on the ground.

26. The method of claim 1 wherein each leg comprises a caster wheel.

27. The method of claim 1 wherein the at least one connecting arm, the mounting arm and/or the swing away arm are comprised of a plurality of parts.

28. The method of claim 1 wherein the vehicle hitch is a vehicle hitch receiver and the at least one connecting arm is configured to slide into the vehicle hitch receiver.

29. The method of claim 1 wherein the caster wheels are configured to support at least the mounting arm, the swing away arm and the support frame when the at least one connecting arm is not attached to the vehicle.

30. The method of claim 1 wherein the connecting arm and the swing away arm each have a length of at least about two feet.

31. The method of claim 1 wherein the swing away tailgate barbeque cooking system further comprises a plurality of cranks coupled to the plurality of legs and configured to raise and lower the height of the plurality of legs.

32. The method of claim 1 wherein the plurality of legs comprises at least two front legs and at least two rear legs.

33. The method of claim 32 wherein, in the storage position, the front legs are located approximately the same distance behind the vehicle, and the rear legs are located approximately the same distance behind the front legs.

34. The method of claim 1 wherein the swing away tailgate barbeque cooking system further comprises a secondary vehicle hitch connecting to the mounting arm for allowing the vehicle to tow a secondary vehicle, the secondary vehicle hitch located below the swing away arm.

* * * * *